United States Patent Office 3,481,036
Patented Dec. 2, 1969

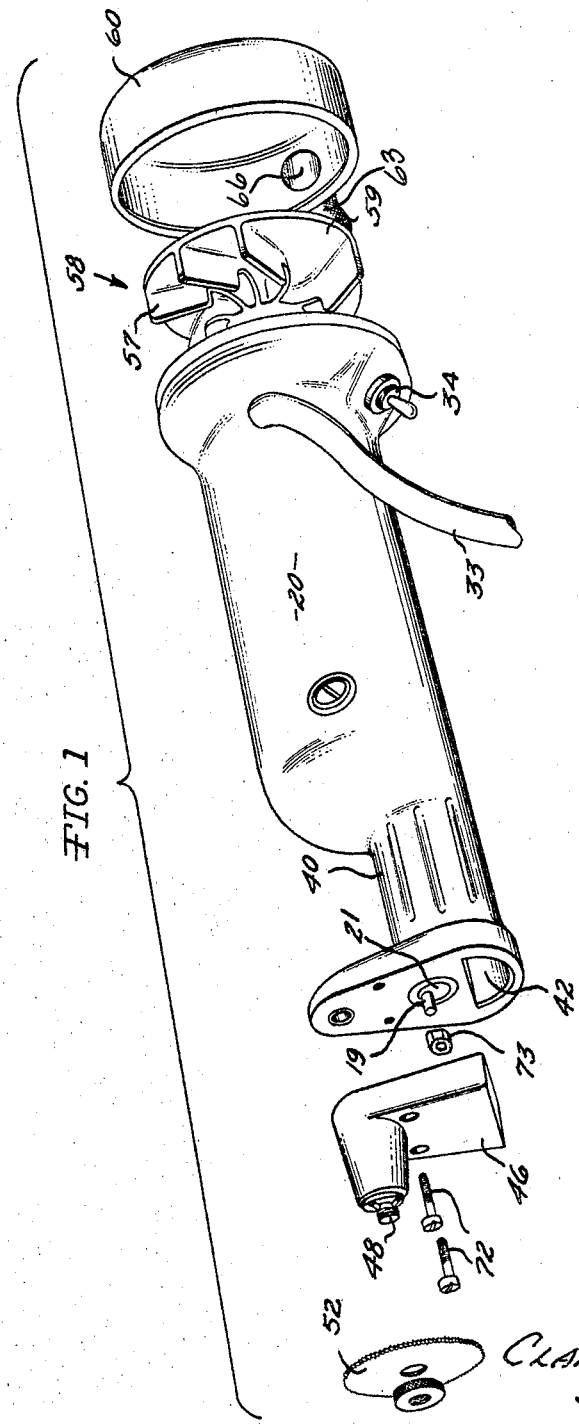

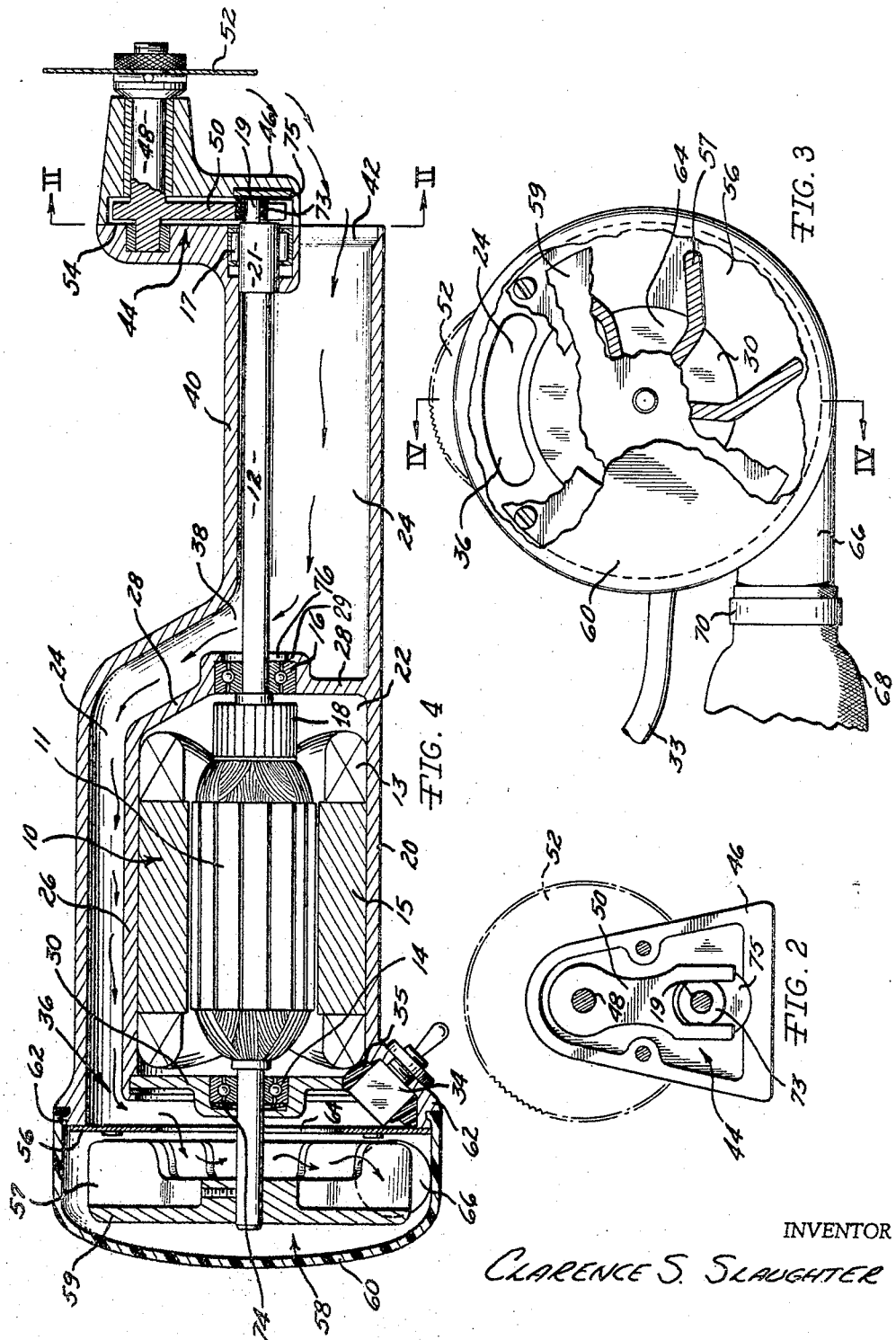

3,481,036
DEBRIS COLLECTING CAST CUTTER
Clarence S. Slaughter, Grand Rapids, Mich., assignor to Lorch Industries, Inc., Grand Rapids, Mich., a corporation of Michigan
Continuation of application Ser. No. 528,737, Feb. 21, 1966. This application Sept. 5, 1967, Ser. No. 665,643
Int. Cl. B26b 11/00
U.S. Cl. 30—124                                           1 Claim

ABSTRACT OF THE DISCLOSURE

A surgical cast cutter of the kind having an oscillatory circular saw driven by an electric motor. More specifically, the setting involves the above kind of cast cutter which includes a debris duct leading to a debris collecting bag, into which airborne dust and other cutting debris is drawn by the motor cooling fan. The invention in general is directed to a special construction or fabrication involving a unitary frame which integrates a streamlined debris duct with a motor and transmission housing.

---

This is a continuation of application Ser. No. 528,737, filed Feb. 21, 1966, now abandoned.

This invention relates to power driven oscillating cast cutters for removing plaster casts or cutting other hard material. In particular the invention relates to an improvement in cast cutters of the type wherein vacuum means are employed to collect the cutting dust and debris in a bag or other waste receptacle.

Prior art devices of the type described have been developed; the most pertinent reference in such art is believed to be U.S. Letters Patent 3,103,069 to J. S. Gary. In these type devices an encased motor was used to drive an oscillating motion transmission which oscillated a circular cutter or saw. A fan, blower, or centrifugal impeller was driveably mounted to the motor shaft, and a channel was built into the casing of the unit to provide an air passage from the cutter to the fan. The fan would draw debris from the cutter through the channel and expel it into a bag or receptacle attached to the unit behind the fan.

The flow of debris laden air, in the previously known devices, followed a sinuous path, from cutter to receptacle, through constrictions and around obstructions and sharp corners. The present invention eliminates constrictions and obstructions to the flow, and eliminates inefficient sharp turns therein. This improves the smoothness of flow and intensifies the flow rate of air through the channel, thereby augmenting the efficiency of the suction at the debris intake port of the channel.

The present invention also improves on previously known cast cutting apparatus by providing a debris channel which is integral with the motor housing. In prior devices the debris channel was formed by a sleeve which was bolted around the motor housing, and peripherally spaced therefrom. The present invention has a smoothly contoured, air tight, integral debris passage which is not subject to leakage or loosening.

The present invention also maintains the motor isolated from the air flow to prevent the collection of debris or foreign matter on the running surfaces of the motor components. Cooling occurs by the flow of air through the debris channel and over the motor compartment portion of the housing. No cooling apertures are bored through the motor casing, and consequently all flow of air is through the debris channel. This maximizes suction efficiency at the point of debris intake because no fan power is diverted to drawing air through the motor. Such diversion of fan power, as well as the likelihood of airborne deposits, were problems of the prior art.

In the prior art the transmission was situated in the path of the debris contaminated air flow and was sealed off therefrom by a protective cup and sealing gasket. The transmission was located inside the housing unit, and was not easily accessible for service or repair. The present invention places the transmission at the front end of the unit inside a removable external cap for greater accessibility.

Accordingly, an object of the present invention is to provide a debris collecting cast cutter which has improved debris collecting charatceristics.

Another object is to provide a debris collecting cast cutter which is more economical to manufacture and which has a transmission that is more accessible to service.

Another object is to provide a cast cutter with a truly integral debris channel which is not subject to loosening under vibration or subject to air leakage.

Still another object is to provide a cast cutter in which the motor and transmission parts are protected from deleterious accumulations of debris or other deposits of airborne matter.

Other objects will be apparent to those skilled in the art, upon reading the following description and drawings wherein:

FIGURE 1 is an exploded perspective view of the present invention with the shroud and fan removed, and the front transmission cap removed, to show the easy accessibility of the transmission for service. FIGURE 1 also shows the simplicity of the housing structure and the minimal number of parts involved in the entire assembly.

FIGURE 2 is an elevation view of the inside of the transmission cap of the invention, showing the transmission supported in the cap, and again showing its accessibility to service. Also shown is the anti-frictionally mounted roller and the hardened thrust pad against which the roller rotates.

FIGURE 3 is a rear end elevation view of the cast cutter of the present invention broken away to show the centrifugal impeller and the rear mouth or discharge port of the debris channel. The fan shroud is broken away, and nearly all of the back up disc of the fan is broken away, leaving the blades of the fan showing in section. The annular flow plate, attached to the end face of the housing unit, is also broken away to show the rear mouth or discharge port of the debris duct. The annular flow plate is spaced apart to the rear from the discharge port and FIGURE 3 shows how the central aperture of the plate guides the air flow from the discharge port into the central portion of the fan blades. This figure also reveals the integral nature of the debris channel and its cross sectional configuration along a longitudinal segment of the rear half of the housing.

FIGURE 4 is a cross section view of the invention taken on the line IV—IV of FIGURE 3, and showing the unobstructed, gently bent profile of the debris carrying channel. The smooth flow of air therethrough is shown by the path of the arrows.

GENERAL DESCRIPTION

In general an electric motor is utilized as a power source. A motor shaft extends from each end of the motor, the front extension being substantially longer than the rear extension. To the rear extension of the shaft is driveably mounted a centrifugal fan which turns with the motor shaft and draws air in the axial direction of the motor shaft, from the front of the unit to the rear thereof. An external housing provides journal support for the motor on its shaft, and also provides a sealed compartment for the motor. To the front end of the motor shaft is connected an oscillating motion transmission which drives an oscillating tool or cutter driveably mounted to the output shaft of the transmission. An easily removed transmission cap attaches to the front of the housing and forms a transmission compartment. The cap supports the transmission and seals it from the surrounding air. Thus there is no problem of the motor or transmission becoming fouled, either by deposits of foreign matter in the air, or by stray debris escaping the suction of the subsequently described debris channel. The motor is completely enclosed so that the suction of the fan does not develop an internal vacuum in the motor compartment. Since there is no substantial pressure gradient between the interior and exterior of the motor compartment, there is no significant air flow through the motor bearings even if they fail to provide a perfect hermetic seal.

The debris channel is formed as an integral portion of the external housing and runs substantially along the entire length thereof, with its intake port situated adjacent to the cutting tool and its outlet port situated adjacent to the fan. The debris channel, or duct, defines an air tight debris conveying passage along the external housing, separated from both the motor and transmission compartments. The front half of the debris channel is also the torque tube portion of the housing which encloses the forward extension of the motor shaft. The rear half of the debris channel is a longitudinal tunnel running integrally along a longitudinal segment or sector of the cylindrical motor compartment. The front and rear halves of the debris channel are laterally displaced, i.e., offset from each other, but are connected by an inwardly angled portion of the rear half of the channel which provides a gradual obtusely angled transversion between the offset parallel channel sections.

A shroud for the fan is provided by a cup shaped cover which slips over the end of the housing to encase the fan. An annular plate or disc is secured to the rear face of the housing to further encase the fan. The plate is spaced rearwardly apart from the discharge port of the debris channel to deflect air flow therefrom into the eye of the fan. The fan develops a centrifugal air pressure against the shroud and plate. The shroud is provided with an integral exit tube portion, tangential to its circumference, through which the flow of debris is expelled. A receptacle, for example a breathing fabric bag, may be connected to this tube to collect the exhausted debris.

When the motor is energized to drive the cutter and fan, debris is picked up at the intake port of the debris channel and flows through the smooth, unobstructed, mildy curved debris channel, to the outlet port thereof. From the outlet port the air flows radially inward to pass through the central aperture of the annular plate and thence into the center of the fan blades. The fan blades then impel the air radially outward against the shroud until the air discharges through the tangential exit tube in the fan shroud. The expelled airborne debris collects in the vacuum bag connected to the exit tube.

SPECIFIC DESCRIPTION

Referring now to the drawings the invention will be described in more detail.

FIGURES 1, 2, 3 and 4 are preferably viewed together for a full understanding of the relationship of elements which accomplishes a simple and sound assembly of the cast cutter. It is best to consider FIGURE 4 first. The FIGURE 1, exploded view, develops the assembly while FIGURE 4 reveals the structure making the assembly possible. FIGURES 2 and 3 illuminate the end attachments in substantial detail.

In FIGURE 4 is best appreciated the housing 20 containing the debris channel 24 and the drive assembly of the complete unit. An electric motor 10 has an armature 11 wound upon a shaft 12. The shaft 12 is journalled in bearings 14, 16 and 17, and is provided with commutator 18 for current pick up from brushes (not shown). At the front end of the shaft 12 is a projecting stub, or crank pin 19, offset somewhat from the centroidal axis of the motor shaft 12. The crank pin 19 may be an integral extension of the motor shaft 12, or project from the separate sleeve 21 press fitted onto the shaft 12 as in the embodiment shown.

The entire drive mechanism is enclosed and supported by housing 20. The housing 20 is an elongate shell cast in two main portions consisting of a motor pocket or compartment 22, and a debris channel 24. The motor compartment 22 is formed by a cylindrical wall 26 having at one end a transverse closure portion 28. A disc or end cover 30 perforated for journalling of the motor shaft 12, is pressed into the other end of the cylindrical motor compartment to complete the closure thereof. Both disc 30 and wall portion 28 have a central aperture or bearing cavity, 29 in which are seated motor bearings 14 and 16, respectively which include dust shields (not shown). The shaft 12 is journalled through these bearings. A third shaft journal is provided by bearing 17 seated in the front of the torque tube portion 40 of housing 20.

Field windings 13 are wound about short pole pieces 15 on the inside of the motor compartment wall 26. The windings 13 lie in a sleeved relation between walls 26 and armature 11. The motor armature 11 is wound into an elongate slender configuration. The field windings 13 form a relatively thin shell which is closely and concentrically telescoped between the motor compartment wall 26 and the armature 11. The armature 11, windings 13, and walls 26 of motor compartment 22, being closely fitted in a tubular, co-axially telscoped relation lend a slender configuration to the entire unit for ease of manual gripping and handling.

The motor compartment 22 has no openings to the outside air. The fit of shaft 12 through the bearings 14 and 16 (with dust seals, as indicated) is such as to preclude air flow into the compartment through these journal points. A portion of the disc plate 30 is cut away to accommodate the on-off switch 34 which is seated in a resilient compound 35 that protects the switch from vibrations and maintains the sealed closure of the motor compartment 22. Electric current is supplied to the switch 34 by electric cord 33.

The housing unit or frame 20 includes an integral debris channel 24. The channel 24 is an air duct through which a vacuum draws off debris and dust produced by cast cutting. The channel 24 is not a straight duct. One part of the channel circumvents the motor compartment 22. This portion of the debris channel is a conduit which runs along an exterior longitudinal strip or segment of the motor compartment wall 26, integrally therewith. This conduit flows around the end of the motor compartment 22 and thus angles obtusely inward along with the motor compartment end wall 28 of which it is an integral part.

The debris channel 24 is seen at 38 to join smoothly with the torque tube portion 40 of the housing 20. This portion of the housing encloses the motor shaft 12, and serves as the forward section of the debris channel 24. The forward section of the debris channel 24 leads to the front portion of the housing 20 where it terminates in the intake port 42 through which cutter debris is received. The other end of the debris channel 24 opens at the rear of the housing 20 via exhaust port 36, which is best seen in FIGURE 3.

In my preferred embodiment, as seen in FIGURE 4, an annular flow plate 56 is attached against the periphery of the rear opening of housing 20 and spaced apart from the channel discharge port 36. Behind the plate 56 is a centrifugal fan or impeller 58, driveably secured to the motor shaft 12. The impeller 58 has curved or angled blades 57 integrally mounted on a solid disc 59. The impeller 58 is surrounded by a fan shroud 60, preferably of plastic, which is attached to the rear end of the housing 20 by snapping over the lip 62 thereon.

The shroud 60, in conjunction with annular plate 56, forms a closure about the fan 58, which closure is open at the central opening 64 through annular plate 56, and also open at exit tube 66, which projects integrally from, and tangential to, the circumference of shroud 60 (see FIGURE 3). The best mode of operation employs a receptacle 68, shown here as a "breathing" fabric bag 68, connected to the tube 66, by spring clamp 70. Other well known means for debris collection, for example a wire mesh container, could be substituted for the vacuum bag.

Referring now to FIGURE 2 the transmission portion 44 of the unit is seen. The drive shaft 48 is journalled through the transmission cap 46 and supported thereby. Inside the cap 46 is a yoke 50, driveably secured at one end to the internal end of the drive shaft 48. The yoke 50 extends perpendicularly from the output drive shaft 48, as seen in FIGURE 4. Referring again to FIGURE 2, the other end of the yoke 50 is spread into a pair of arms which embrace the motor shaft crank pin 19. The crank pin 19, being offset from the centroidal axis of the motor shaft, describes a cranking or circular path when the shaft 12 rotates. The horizontal component of the crank pin movement reciprocates the yoke 50. The reciprocation is translated by the yoke 50 into an oscillatory rotation of the attached drive shaft 48. The drive shaft 48 is connected at its exterior end to the circular cutter or saw 52, which oscillates through a small angle determined by the throw of the crank pin 19. The transmission cap 46 is firmly secured flush to the periphery of the frontal face 54 of the housing 20 by bolts 72 (FIGURE 1) and thereby seals the transmission from the atmosphere.

The preferred embodiment utilizes a roller 73 which is slipped over the crank pin 19 where it is embraced by the yoke 50. This arrangement then provides an anti-frictionally mounted member between the yoke 50 and crank pin 19, for smoother working engagement therebetween. Means are also provided for restraining of motor shaft motion in the axial direction. The motor shaft bearings 14 and 16 are attached to the shaft 12 so that they cannot slide thereon in the axial direction. The bearing 14 then presses against the resilient Belleville washer 74 when the unit is assembled, while at the other end of the motor the bearing 16 thrusts axially against the circular shoulder 76, and the shaft 12 is thereby axially positioned. Roller 73 may float forward against the hardened thrust pad 75.

OPERATION

Electric current is supplied to the motor via cord 33 and switch 34, and the motor turns at high speed to oscillate the saw blade 52. The oscillating type saw is a feature widely used in cast cutters to minimize the danger of cutting through the cast being removed and injuring the patient inside the cast. The very short stroke of the saw merely jiggles pliable material, such as human skin, but cuts through rigid material like that of a plaster cast.

The fan draws air into the debris conduit 24 at the intake port thereof 42. Cutting debris from the saw 52 is captured by the air flow and enters the port 42, to flow axially through the torque portion 40 of the channel 24. At 38 the flow merges gracefully into the second narrower portion of the debris channel and sweeps in an obtuse angle around the motor compartment wall 28 to rear channel mouth 36. The fan then draws the air through the center of the annular plate 56, into the fan blades 57.

The fan 58 rotates with the motor and operates on a centrifugal principle, the blades 57 of the fan 58 thrusting air radially outward against the fan shroud 60. The pressure on the shroud causes the air to flow out of the shroud 60 through the exit tube 66. The expelled air is replaced by an inflow of debris carrying air through aperture 64 in annular plate 56, the entire process occurring continuously.

A central feature of the present invention is the streamlined character of the debris channel 24 with the elimination of obstructions to, and sharp turns in, the air flow. This is to be contrasted with prior art structures as exemplified by the disclosure in the previously cited U.S. Letters Patent 3,103,069. In that apparatus the flow turned sharply as it left the torque tube portion of the debris duct to circumvent the motor portion of the machine. The air flowed axially through an irregular path to encounter a cup-like housing which deflected the air downward in a right angle turn. This was followed by a subsequent right angle deflection back to a horizontally directed flow. Then the flow sharply constricted to pass through a thin passage circumferentially spaced between the inner and outer casings of the unit. The two right angle turns destroyed the smooth, laminar nature of the flow and created turbulence. The turbulence caused viscous losses of energy attended by a decreased suction effect at the debris intake. The narrowness of the passage between the inner and outer casings also caused frictional losses of flow velocity. The outer casing was spaced from the inner casing by ribs which were situated in the air flow and therefore these too interfered with the flow efficiency. Still another reduction in efficiency of the flow was caused by the right angle turns of the flow path.

The present invention greatly improves the efficiency of the fan and the debris collecting vacuum, by eliminating sharp bends, constrictions, and rib obstructions from the air flow, and by providing a gradually bending debris channel of greater cross-sectional area. The gentle deflections of flow direction minimize energy losses caused by turbulence and skin friction.

The present invention also directs all the fan power to intake of debris. No flow is directed through the motor armature and windings. Heat is carried away from the motor by air passing through the debris channel along the outside of the motor compartment wall 28. Thus all the fan power is utilized in the suction of debris, rather than a substantial part of its power being diverted to draw an additional flow of non-debris carrying air through the motor compartment.

Moreover, since the motor compartment is closed to passage of air, the moving parts of the motor are not subject to fouling by an accumulation of dust or debris from the cutting tool, or other impurities and particles naturally present in the atmosphere.

A still further advantage of the presently described structure is the location of the transmission 44 in the cap 46 which is bolted externally to the front end of the housing 20. The transmission is subject to wear from the repetitive forces of high speed oscillation, and in the present invention the transmission is accessible for repair or replacement of its parts by merely removing the two bolts 55 and pulling off the cap 20. This may be contrasted with the prior art devices which enclosed the transmission far inside the housing. The cap 46 of the instant invention not only supports the transmission 44 but encases it against air flow and resultant accumulations of dust or debris.

Thus the present invention provides a cast cutter substantially improved over prior cast cutters by supplying a structure with greatly improved debris collecting characteristics. The drive motor and transmission have been sealed against damaging accumulation of cutting dust and atmospheric impurities, and the transmission has been disposed for easy service and accessibility. The debris channel is integral with the housing which precludes the channel from loosening or leaking.

Having thus described a preferred operative embodiment of my invention, improvements, modifications, and adaptations will be apparent to persons skilled in this art, and such improvements, modifications, and adaptations are intended to be included within the spirit of the present invention, which is to be limited only by the scope of the hereinafter appended claim.

I claim:

1. In a debris collecting surgical cast cutter of the type having a motor with one end of its drive shaft substantially extended, a motion transmission connected to the extended end of said shaft, a fan driveably connected to the other end of said shaft, an oscillating cutting element connected to the output drive of the transmission, a housing for the motor shaft and transmission, and a debris channel for passage of cutting debris from the oscillating element toward the fan; a unitized construction comprising a main frame, defining:

a relatively slender, generally hand-graspable cylindrical motor pocket portion, open at one end, and tapering at the other end into an elongate, more slender cylindrical drive shaft enclosure portion for said drive shaft extension, extending co-axially from said other end of said motor pocket and opening forwardly thereof to the atmosphere, adjacent said cutting element, and including also adjacent said forward opening a transmission pocket, and debris sealing cover means therefor, a debris duct formed integrally along an exterior sector of said motor pocket and opening at one end adjacent said fan and communicating at the other end to the interior of said drive shaft enclosure, thereby forming an integral, gently deflecting debris path from said cutting element to said fan;

a single motor drive shaft coaxial with said motor and having an integral crank pin;

a yoke element operably engaged with said crank pin of said motor drive shaft and integral with a cutter drive shaft parallel to and off set from said motor drive shaft for driving a cutter element; and motor sealing bearing means at each end of said motor pocket; and means for collecting said debris from said fan.

References Cited
UNITED STATES PATENTS

| | | | |
|---|---|---|---|
| 2,052,630 | 9/1936 | Hoskwith | 30—124 |
| 2,244,683 | 6/1941 | Fisher | 30—167 X |
| 2,370,865 | 3/1945 | Lev | 30—124 |
| 3,103,069 | 9/1963 | Gary | 30—124 |

ROBERT C. RIORDAN, Primary Examiner